United States Patent [19]

Scott

[11] Patent Number: 5,617,087
[45] Date of Patent: Apr. 1, 1997

[54] PARKING AID FOR PARKING VEHICLES IN A COVERED GARAGE

[76] Inventor: Thomas J. Scott, 1225 Cherry Creek Blvd., Spring Branch, Tex. 78070

[21] Appl. No.: 505,565

[22] Filed: Jul. 21, 1995

[51] Int. Cl.⁶ ..................................................... B60Q 1/48
[52] U.S. Cl. .................. 340/932.2; 340/686; 200/61.41; 116/29
[58] Field of Search ................................ 340/932.2, 933, 340/686; 200/61.42, 61.41; 116/28 R, 29

[56] References Cited

U.S. PATENT DOCUMENTS

| | | | |
|---|---|---|---|
| 2,854,942 | 10/1958 | Ross | 116/28 R |
| 4,101,868 | 7/1978 | Bubnich et al. | 340/932.2 |
| 4,288,777 | 9/1981 | Luik | 340/932.2 |
| 4,311,983 | 1/1982 | Piper | 340/932.2 |
| 4,318,077 | 3/1982 | Bubnich et al. | 340/932.2 |
| 4,341,488 | 7/1982 | Ryan | 404/10 |
| 4,965,571 | 10/1990 | Jones | 340/932.2 |
| 5,231,392 | 7/1993 | Gust | 340/932.2 |
| 5,500,642 | 3/1996 | Battle | 340/932.2 |

OTHER PUBLICATIONS

Heartland America (Jul., 1995), p. 27.
"SkyMall", Continental Airlines (Summer, 1995), p. 37.

*Primary Examiner*—Jeffery Hofsass
*Assistant Examiner*—Julie B. Lieu
*Attorney, Agent, or Firm*—Gunn, Lee & Miller, P.C.

[57] ABSTRACT

A parking device for vehicles entering a ceiling-covered parking garage comprising a housing for substantially enclosing an electrical circuit, the electrical circuit including a light-emitting bulb and a switch for opening and closing the electrical circuit to light and unlight the bulb as well as a power supply, and further providing a cord for suspending the housing from the ceiling of the parking garage so that the housing may intercept the vehicle to be parked, close the switch of the circuit, thereby emitting a light signal to the driver of the vehicle to let the driver know that the vehicle has reached the predetermined parking position.

19 Claims, 3 Drawing Sheets

PARKING AID FOR PARKING VEHICLES IN A COVERED GARAGE

FIELD OF THE INVENTION

The present invention relates to a parking aid for parking vehicles in a covered garage, and more particularly to a parking aid for vehicles approaching an obstacle, such as a wall of the garage or the like.

BACKGROUND OF THE INVENTION

The use of vehicle parking assistance devices is well known in the prior art. However, the prior art parking aid devices suffer from inconvenient and unnecessary bulk and weight, typically taking up too much space in the garage and obstructing walls and floors while in use and also while not in use. Typically, the prior art parking aid devices include floor-mounted "bump mats" which sense the tire or approaching vehicle part and transmit the contact to the driver through the chassis of the vehicle.

A second category of prior art devices includes floor-, wall- or ceiling-mounted signal transmitting units typically having rigid probes which intercept the vehicle as it is being parked. These units transmit visual and/or audio signals which are activated when the probe contacts the vehicle. Typically, such audio and/or visual parking aid devices include a transformer and electrical cord for drawing power from the household's AC circuit or include DC dry cells. Further, some prior art wall-, floor-, or ceiling-mounted parking signal devices include electrical motion sensors for sensing, without the use of a probe, the position of the vehicle as it approaches the predetermined stopping point and then emitting a signal to alert the driver to the position of the vehicle.

The bulk end complexity of the prior art devices make them expensive, lack portability, and difficult to store for use or sale.

What is needed is a small, lightweight, ceiling-suspended, easily-mounted unit which is simple to manufacture and use, has only a few parts, and is effective to indicate the position of the vehicle to the driver.

OBJECTS OF THE INVENTION

It is an object and purpose of the present invention to provide a vehicle parking assistance device which is simple in construction and use, employs a minimal number of parts, is completely portable, and is easy to mount and use.

It is a further object and purpose of the present invention to provide a parking aid device for vehicles entering a ceiling-covered parking garage which may be suspended on a cord from the ceiling of the parking garage to intercept the car approaching the parking spot and provide a signal to the driver of the car.

It is yet another object and purpose of the present invention to provide a small, lightweight, unitary parking aid device including a string for suspension that is easy to construct and that will hang from the ceiling of the parking garage to intercept the windshield of the vehicle as it approaches the preselected parking space.

SUMMARY OF THE INVENTION

In accordance with the objects and purposes of the present invention, a parking device for vehicles entering a ceiling-covered parking garage is provided comprising a housing for substantially enclosing an electrical circuit, the electrical circuit including a light-emitting bulb and a switch for opening and closing the electrical circuit to light and unlight the bulb as well as a power supply, and further providing a cord for suspending the housing from the ceiling of the parking garage so that the housing may intercept the vehicle to be parked, such interception for closing the switch of the circuit to emit a light signal to the driver of the vehicle to let the driver know that the vehicle has reached the predetermined parking position.

DETAILED DESCRIPTION OF THE PREFERRED EMBODIMENT

Figure 1:
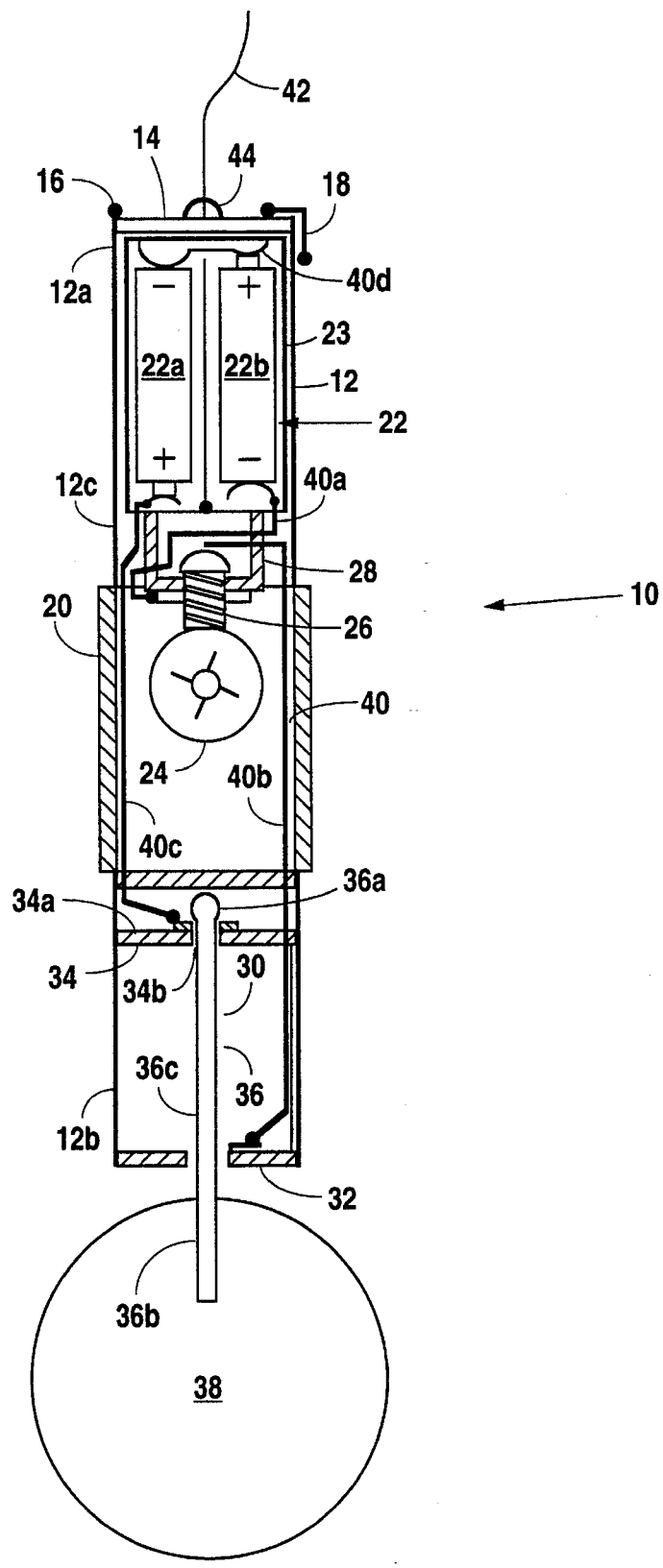
FIG. 1 is a cutaway, side elevational view along the longitudinal axis of the housing of applicant's present invention.
Figure 2:
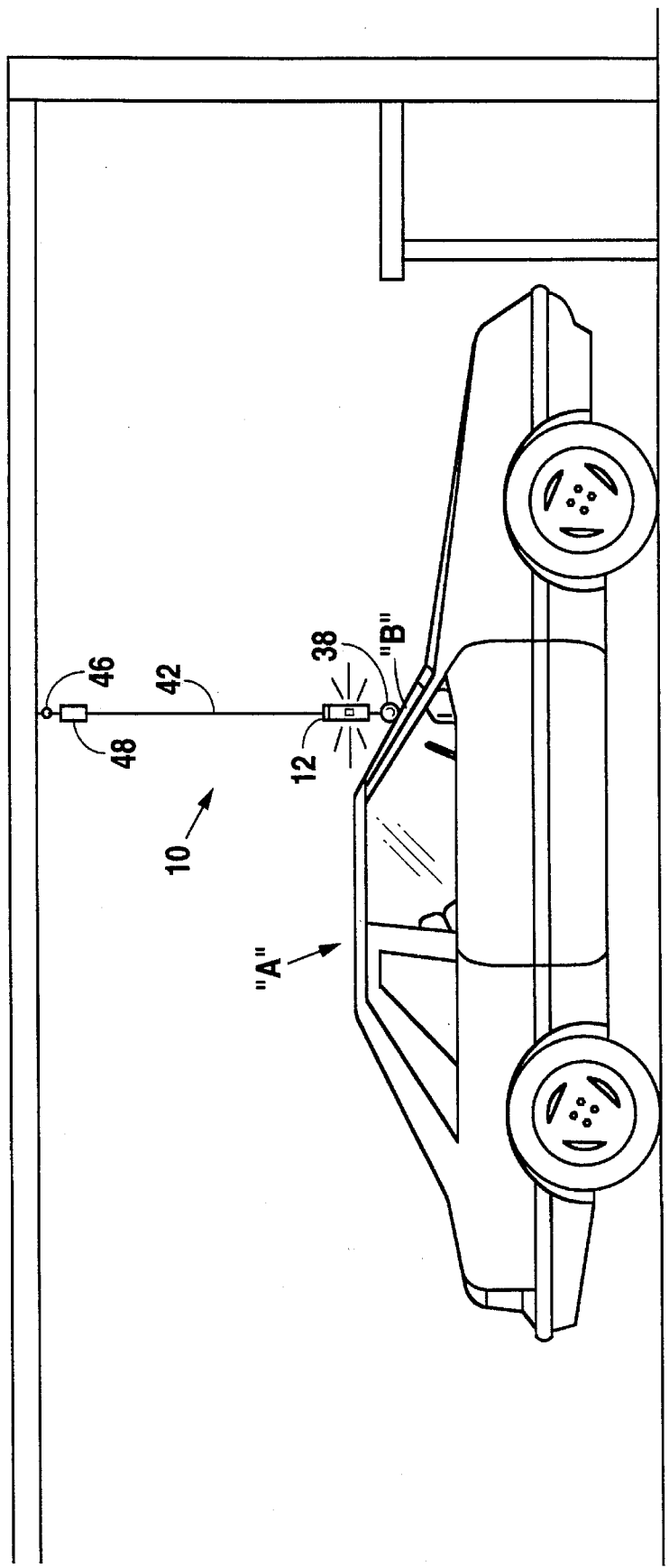
FIG. 2 is a side elevational view of the environment in which applicant's present invention is utilized.

FIGS. 1 and 2 illustrate applicant's present invention. More particularly, applicant's present invention is a parking aid (10) designed to hang vertically from the ceiling of a parking garage as illustrated in FIG. 2.

Turning to FIG. 1, it is seen that applicant's parking aid (10) includes a housing (12), typically made of cylindrical PVC tubing or other preferably electrically non-conductive material. The housing has a first end (12a), a second end (12b), and a body (12c). At the first end (12a) of applicant's housing (12) is an end cap (14) which engages the side walls of the housing through the use of hinges (16). This allows the end cap (14) to pivot and a latch (18) secures it in a closed position.

Typically, body (12c) of housing (12) incorporates a lens (20), typically red, non-opaque plastic (red acrylic tubing, for example), and providing a 360° view of the light signal emitted therethrough.

A power supply (22), typically consisting of two 1.5 V AA batteries (here indicated as (22a) and (22b)) is typically included in a small plastic battery case (23) for insertion through first end (12a) of housing (12). The power supply is typically located within housing (12) and accessed through the use of hinge-mounted end cap (14).

An electrical circuit is provided which is typically contained within the body of the housing (12), with the exception of the switch means (30) as set forth in more detail below, part of which hangs below second end (12b) of housing (12). The electrical circuit of applicant's invention includes a bulb (24) threadable into a lamp socket (26). The lamp socket (26) is typically held to the inner walls of body (12c) or the battery case (23) through the use of a bracket (28).

A switch means (30) is provided to open and close the electrical circuit to provide electrical energy to bulb (24). Switch means (30) includes a flat, disk-shaped anode plate (32) and a flat, disk-shaped cathode plate (34) having a top surface (34a) therein and a hole (34b) therethrough. The hole is typically located at center of the cathode plate (34). The switch means (30) includes the cathode plate (34) and the anode plate (32) as well as a hanging member (36) which acts as a pendulum to provide contact between the anode plate (32) and the cathode plate (34) in a manner set forth in more detail below. The switch means (30) activates the lamp upon the hanging member (36) being struck in any direction. More specifically, hanging member (36), made up of a material capable of conducting an electric current, has an articulated first end (36a) for insertion through hole (34b). Hanging member (36) also has a removed end (36b) and an electrically-conductive body (36c) located between the articulated end (36a) and the removed end (36b). It is noted with reference to FIG. 1 that removed end (36b) includes a contact body (38), here typically a soft spherical ball made of foam or other suitable material and typically brightly colored. The contact body (38) is designed to contact the windshield of a vehicle in such a fashion that displacement of hanging member (36) allows the body (36c) thereof to touch the inner walls of the anode plate (32) and thereby close the circuit between the anode plate (32) and the cathode plate (34).

It is seen that located within the housing (12) of applicant's parking aid (10) is a wiring harness (40) having leads (40a), (40b), (40c) and (40d) for connecting the anode plate (32) and cathode plate (34) to the power supply (22) and bulb (24), in series, such that displacement of the hanging member (36) acts as a switch to close the circuit and energize bulb (24).

Housing (12) is suspended by a cord (42), typically nylon, having a first end (12a) and a second end (12b). The first end (12a) is typically connected to a loop (44) at first end (12a) of the housing (12). The second end (12b) is typically attached to the ceiling of the garage through the use of a ceiling eye bolt (46) or other suitable suspension means. An optional feature of applicant's present invention is the use of a retracting spool (48), as used in suspended lamp fixtures and the like, between the first end (12a) and the second end (12b) of the cord (42) such that the housing (12) may be retracted up to near the ceiling, so as to be out of the way when not required for use.

In use, applicant's device is suspended such that the contact body (38) is located about windshield level (B), just above the point at which the driver wishes the car to be parked in the garage. When so suspended, the hanging member (36) and the housing (12) will be hanging vertically on the cord (42). When the vehicle (A) approaches, the housing (12) and the contact body (38) strike the windshield, displacement of the hanging member (36) will close the circuit, and allow the bulb (24) to light up, through the lens (20) of the housing (12). At this point, the vehicle would typically be backed up slightly, just sufficient to release the contact body (38) from contact with the windshield, and open the circuit. The car will then be in its proper parking place. It is noted that the cord can cause the housing to rotate freely but will not affect the operation of the switch. Specifically, the use of the disk-shaped plates allows the switch to work even if the housing swivels through 360° as it hangs on the cord.

Figure 3:
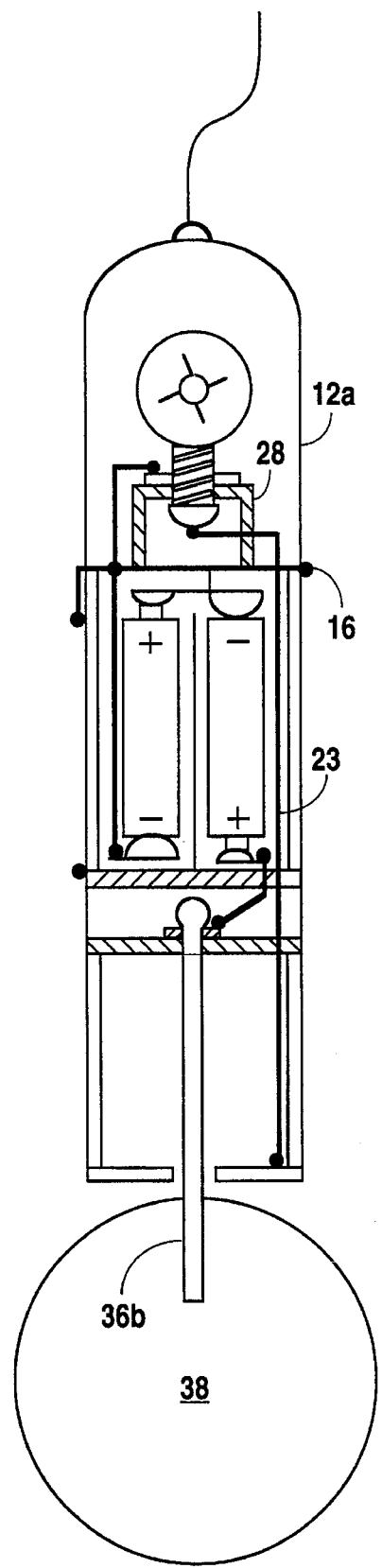
FIG. 3 is a cutaway, side elevational view of an alternate preferred embodiment of applicant's present invention.

FIG. 3 illustrates an alternate preferred embodiment of applicant's present invention where the battery case (23) is beneath the bulb and bracket (28). The battery case, bulb, and batteries are a single unit.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A parking aid device for vehicles entering a ceiling-covered parking space, the device comprising:
   a housing having walls and including a non-opaque lens, the housing containing therein:
   a power supply;
   a lamp including a bulb;
   a wiring harness, including wiring and switch means for opening and closing the circuit, for connecting in circuit the switch means to the lamp and the power supply;
   means for suspending said housing from the ceiling of the parking space such that a vehicle entering the parking space will, upon contacting said device, cause the switch means to energize said lamp, thereby providing a visual indication of the position of the vehicle; and
   the switch means comprising conductive plates and a hanging member suspended through the center of said plates, the switch means energizing the lamp upon the hanging member being struck in any direction.

2. The vehicle parking aid device of claim 1, wherein said means for suspending said housing is a cord with a first end and a second end and a body between the first end and the second end, the first end for attaching to a ceiling of the garage and a second end for attaching to said housing.

3. The vehicle parking aid device of claim 2, wherein the distance between the first end and the second end of said cord is sufficient to place the housing about windshield level on the vehicle such that the windshield of the vehicle is the first part of the vehicle to make contact with the device.

4. The vehicle parking aid device of claim 3, wherein the switch means includes a hanging member, the hanging member for contacting the windshield of the vehicle being parked.

5. The vehicle parking aid device of claim 4, wherein the hanging member includes a soft ball at a removed end thereof, the soft ball for contacting the windshield of the vehicle being parked.

6. The vehicle parking aid device of claim 5, wherein said housing has a first end and a second end, and wherein the ball of said hanging member is located beneath the second end.

7. A parking aid device for vehicles entering a ceiling-covered garage parking space, the device comprising:
   a housing;
   an electrical circuit including a light-emitting bulb, a switch means for opening and closing said electrical circuit to light and unlight the bulb when a vehicle engages said device, the switch means comprising conductive plates and hanging member suspended through the center of said plates, wherein the switch energizing the lamp upon the hanging member being struck in any direction, the electrical circuit dimensioned for substantial enclosure within said housing; and
   a cord having a first end and a second end for vertically suspending said housing from the ceiling of said garage.

8. The vehicle parking aid device of claim 7 further comprising a lens and wherein said bulb is capable of being viewed through said lens from a 360° field of view perpendicular to the axis of the vertical suspension.

9. The vehicle parking aid device of claim 8, wherein the switch means includes a hanging member, the hanging member for contacting the windshield of the vehicle being parked.

10. The vehicle parking aid device of claim 9, wherein the distance between the first end and the second end of said cord is sufficient to place the housing about windshield level on the vehicle such that the windshield of the vehicle is the first part of the vehicle to make contact with the device.

11. A parking aid device for vehicles entering a ceiling-covered parking space, the device comprising:

a housing having walls and including a non-opaque lens, the housing containing therein:

a power supply;

a lamp including a bulb;

a wiring harness, including wiring and switch means for opening and closing the circuit, for connecting in circuit the switch means to the lamp and the power supply wherein the switch means includes conductive plates and a hanging member, the hanging member for contacting the windshield of the vehicle being parked, wherein the hanging member suspending through the center of said plates for energizing the lamp when being struck in any direction, and the hanging member includes a soft ball at a removed end thereof, the soft ball for contacting the windshield of the vehicle being parked;

means for suspending said housing from the ceiling of the parking space such that a vehicle entering the parking space will, upon contacting said device, cause the switch means to energize said lamp, thereby providing a visual indication of the position of the vehicle, wherein said means for suspending said housing is a cord with a first end and a second end and a body between the first end and the second end, the first end for attaching to a ceiling of the garage and a second end for attaching to said housing, wherein the distance between the first end and the second end of said cord is sufficient to place the housing about windshield level on the vehicle such that the windshield of the vehicle is the first part of the vehicle to make contact with the device.

12. The vehicle parking aid device of claim 11, wherein the switch means further includes an anode plate and a cathode plate, the cathode plate capable of contacting and suspending in an articulating manner, the hanging member at the first end thereof, vertically, such that such vertical suspension places the body of the hanging member adjacent the anode plate and displacement of the body, when the removed end contacts the vehicle, causes contact with anode plate and closes the circuit, lighting the lamp.

13. The vehicle parking aid device of claim 11, wherein said housing is cylindrical.

14. The vehicle parking aid device of claim 11, wherein the lens of said housing is cylindrical.

15. The vehicle parking aid device of claim 11, wherein said housing includes means for attaching the cord to the first end.

16. The vehicle parking aid device of claim 11, wherein the cylinder of said housing is between 3 inches and 18 inches long and between 1½ inches and 4 inches in diameter.

17. The vehicle parking aid device of claim 11, wherein said housing further includes a lid at the first end thereof, the lid openable to allow access to the power supply.

18. The vehicle parking aid device of claim 11, wherein said power supply includes multiple dry cells.

19. The vehicle parking aid device of claim 11 further including a bracket for holding the lamp within the walls of said housing.

* * * * *